United States Patent [19]
McColl

[11] 3,865,160
[45] Feb. 11, 1975

[54] SPLIT PHASE HEAD REACH SYSTEM FOR TREE HARVESTER

[75] Inventor: Bruce John McColl, Whitby, Ontario, Canada

[73] Assignee: Owens-Illinois, Inc., Toledo, Ohio

[22] Filed: Jan. 23, 1974

[21] Appl. No.: 435,917

Related U.S. Application Data
[63] Continuation of Ser. No. 227,181, Feb. 17, 1972.

[52] U.S. Cl................. 144/3 D, 144/2 Z, 144/34 E
[51] Int. Cl............................................. A01g 23/08
[58] Field of Search ........ 144/2 Z, 3 D, 34 R, 34 E, 144/309 AC

[56] References Cited
UNITED STATES PATENTS

| | | | |
|---|---|---|---|
| 3,269,436 | 8/1966 | Moore | 144/3 D |
| 3,348,592 | 10/1967 | Winblad et al. | 144/3 D |
| 3,389,728 | 6/1968 | Galis | 144/3 D X |
| 3,533,458 | 10/1970 | McColl | 144/3 D X |
| 3,556,183 | 1/1971 | Busch | 144/3 D X |
| 3,590,894 | 7/1971 | Boyd | 144/3 D |
| 3,720,246 | 3/1973 | David | 144/3 D |
| 3,763,905 | 10/1973 | Hamilton et al. | 144/3 D |

FOREIGN PATENTS OR APPLICATIONS

| | | | |
|---|---|---|---|
| 247,696 | 11/1969 | U.S.S.R. | 144/3 D |

Primary Examiner—Gerald A. Dost
Attorney, Agent, or Firm—Browne, Beveridge, De Grandi & Kline

[57] ABSTRACT

A head-reach system for tree harvesting machines has a pair of secondary arms, one carrying a tree shearing means and the other carrying a grasping, transfer and feed mechanism. The secondary arms are positioned one above the other for operation in vertical arcs and by positioning the shear with one arm while transferring a previously severed tree with the other arm, both arms cooperate to split the operating cycle of present systems.

8 Claims, 21 Drawing Figures

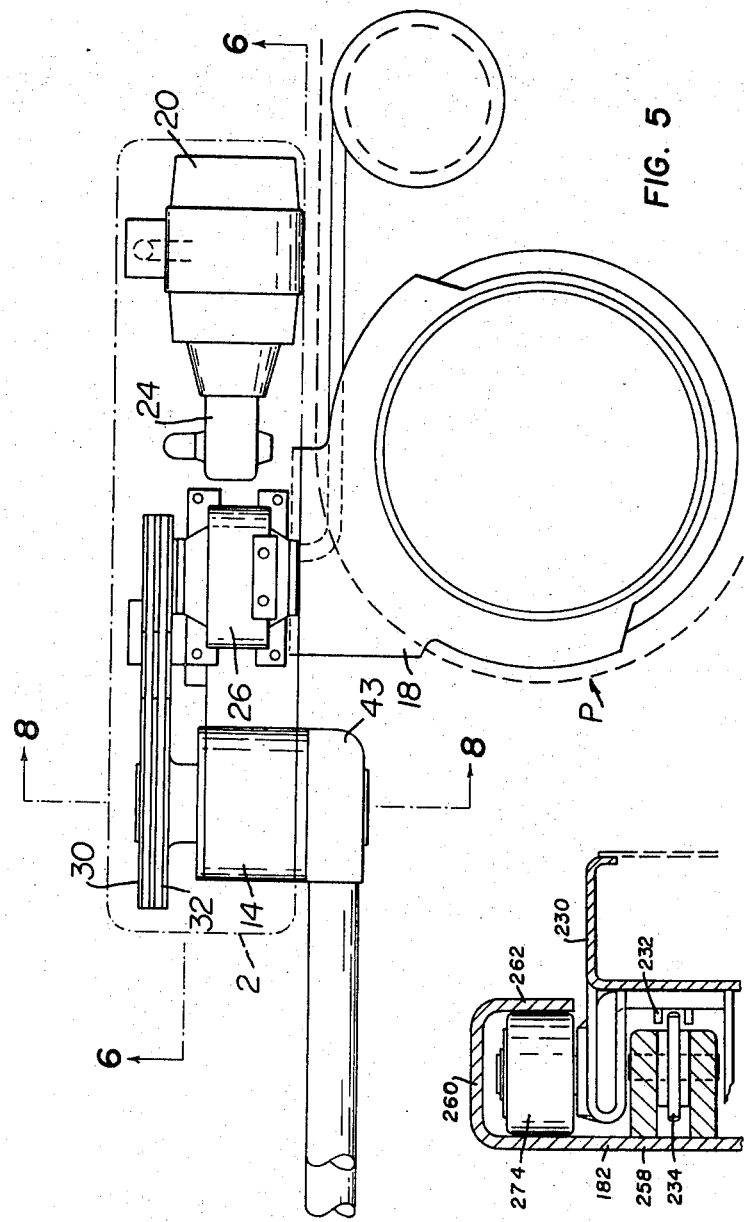

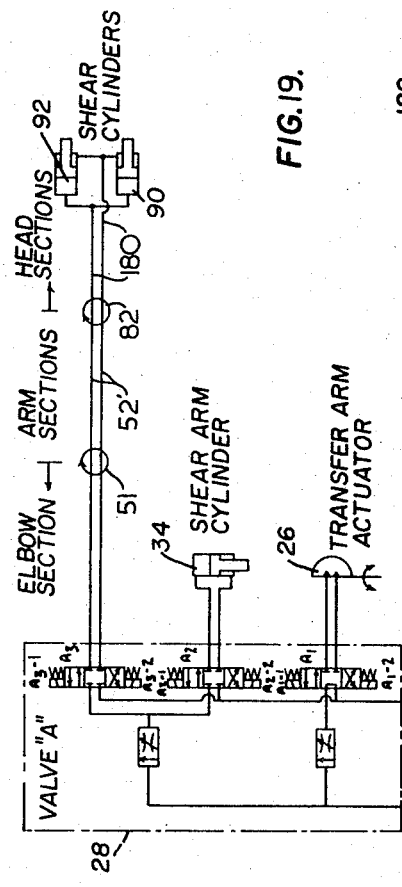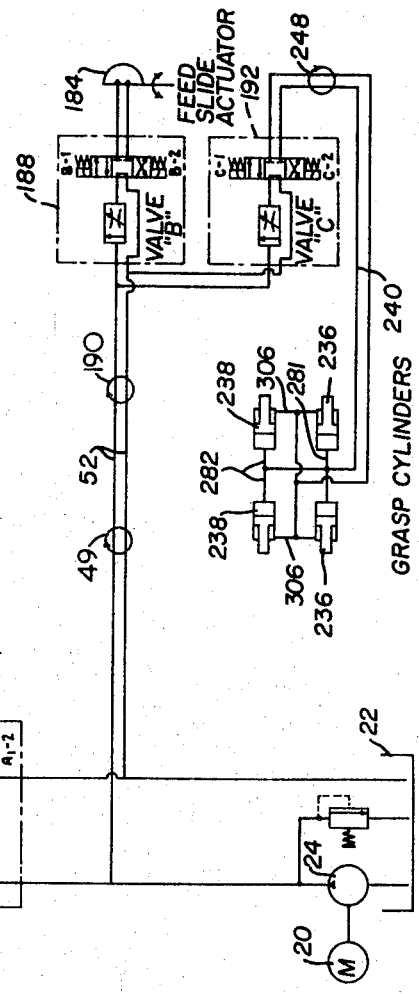
FIG.19.

SPLIT PHASE HEAD REACH SYSTEM FOR TREE HARVESTER

This is a Continuation, of application Ser. No. 227,181, filed Feb. 17, 1972, which is relied upon and the entire disclosure and specification of which is hereby incorporated by reference.

This invention relates to tree harvesting and in particular to headreach systems for tree harvesting machines. The apparatus disclosed in this specification is adaptable for use on various chassis arrangements and harvesting machines. However, for the purpose and convenience of using an example, the head-reach system of the present invention may be considered as an alternative, interchangeable system for that shown on the tree harvesting and processing machine in U.S. Pat. No. 3,533,458 of Oct. 13, 1970.

Specifically, U.S. Pat. 3,533,458 discloses a tree harvesting and processing machine having articulated, fore and aft chassis sections. The fore section carries at least one tree harvesting and processing unit, the trees processed thereby being passed into a storage means on the aft chassis section. The tree harvesting and processing unit includes at least one primary arm supporting a tree processing station including delimbing and debarking means, feed mechanism and a chipper, this primary arm being swingable in a horizontal plane. A headreach system is secured to the primary arm for movement with respect thereto in vertical and horizontal planes and includes a secondary arm carrying tree grasping, severing and handling means for cutting a tree from its stump and transferring it to, and feeding it into, the processing means on the primary arm. The functional cycle of the head-reach system in U.S. Pat. No. 3,533,458 is for the secondary arm and its associated mechanism to reach out to a standing tree remote from the harvester, sever the tree; transfer it to the processing means and feed it therein; then release the tree bole and reach out again to another tree.

The object of the present invention is to provide apparatus to split the above mentioned functional cycle and thereby substantially increase the production capabilities of the head-reach system.

Accordingly, the present invention provides, in one aspect, a head reach system for tree harvesting machines and comprises a base assembly for connection to a tree harvesting machine; a pair of arms pivoted to and extending outwardly of said base assembly and positioned one above the other; tree shearing means attached to the outer end of a first arm of said pair thereof; tree grasping and transfer means attached to the outer end of the second arms of said pair thereof; means for actuating the shearing means and for moving the first arm through a limited vertical arc with respect to the base assembly; and means for actuating said grasping and transfer mechanism and for moving the second arm through a limited vertical arc with respect to the base assembly and with respect to said first arm.

The features of the present invention and its method of operation will be apparent from the following detailed description of one embodiment of the invention and the accompanying drawings wherein:

FIG. 1 is a perspective view of the apparatus of the present invention connected to a primary arm of a tree harvesting and processing machine of the type shown in the U.S. Pat. No. 3,533,458;

FIG. 5 is a plan view of the assembly of FIG. 4 with the cover shown in phantom line;

Figure 15:
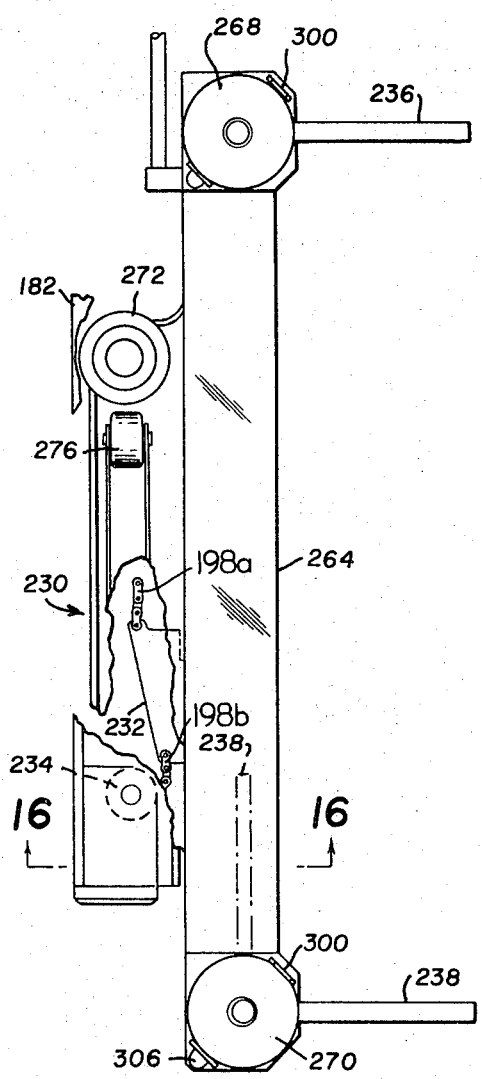
FIG. 15 is a side elevation of the grasping and feeding unit shown in FIG. 2.
Figure 17:
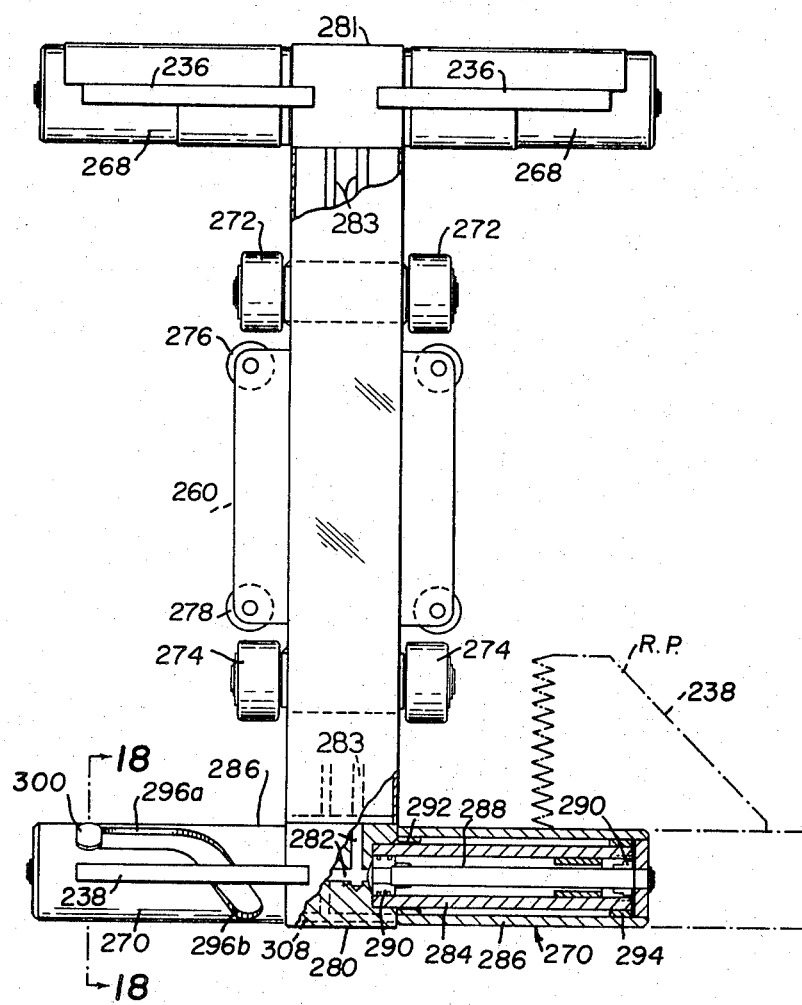
Figure 18:
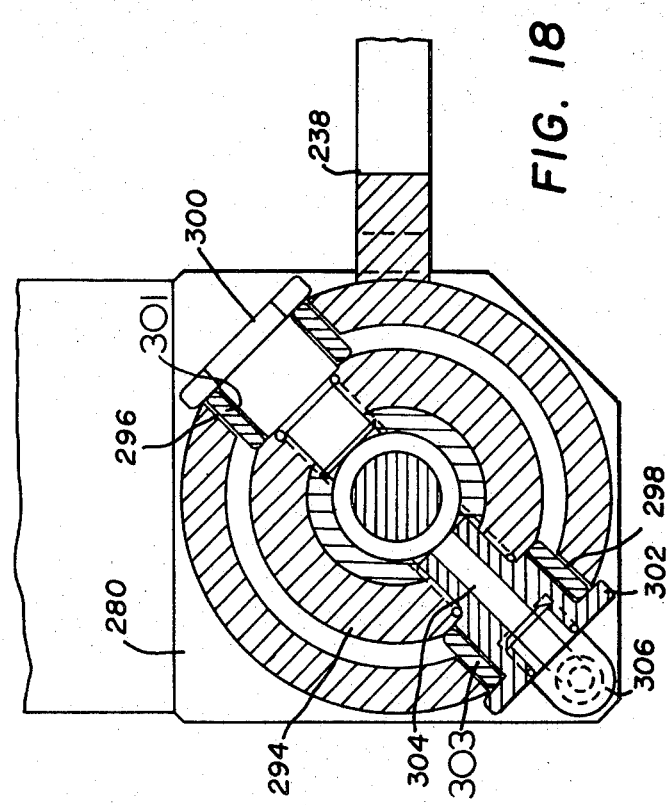
Figure 20:
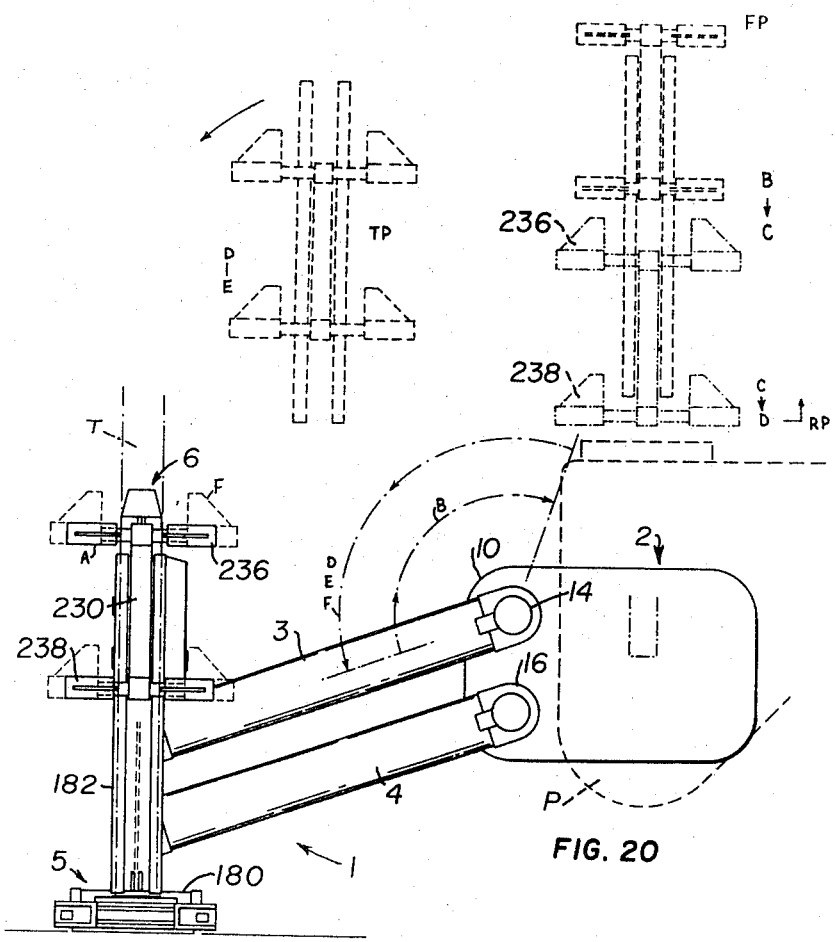
Figure 21:
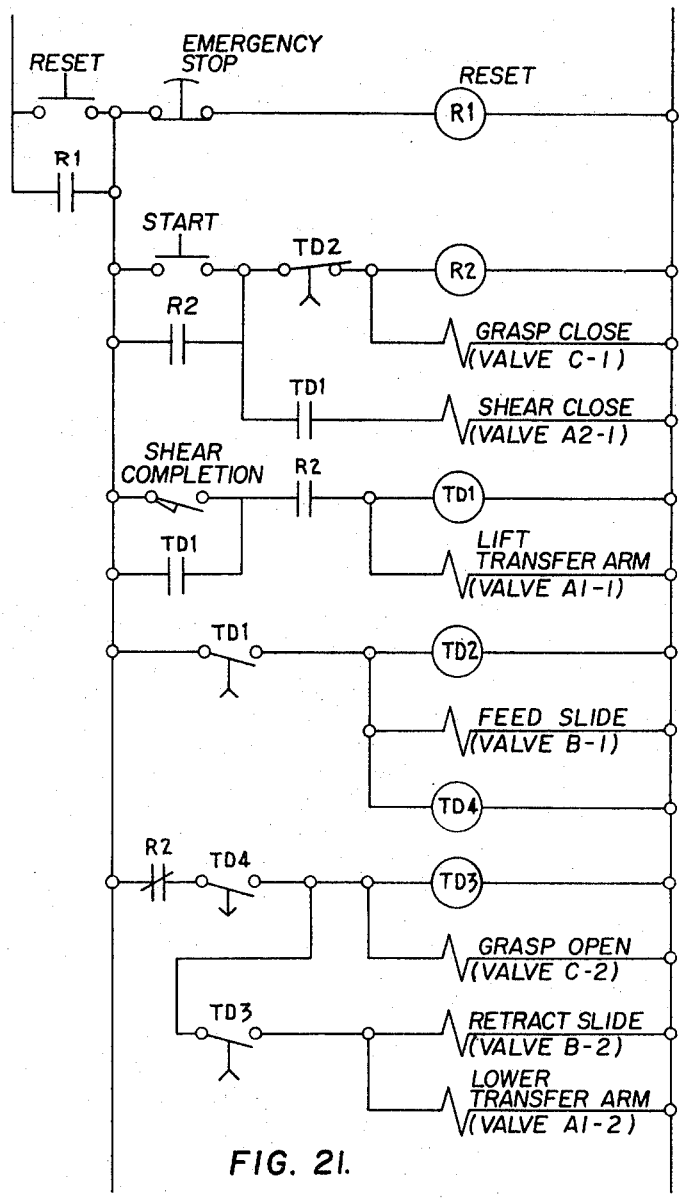

FIG. 16 appears on the same sheet as FIG. 5 and is a sectional view along the line 16—16 of FIG. 15;

FIG. 17 is a front elevational of the grasping and feeding unit;

FIG. 18 is a section along lines 18—18 of FIG. 17;

FIG. 19 is a schematic illustration of the hydraulic circuit of the apparatus;

FIG. 20 is a side elevation of the complete apparatus showing various operative positions of the arms; and FIG. 21 is an electrical diagram of a reset cycle timer for the feed system;

GENERAL DESCRIPTION

The head-reach system of this application is illustrated by way of example, as being mounted on a tree harvesting machine of the type shown in U.S. Pat. No. 3,533,458 and in particular, replacing the secondary arm and associated mechanism described in the preamble of this disclosure.

Figure 1:
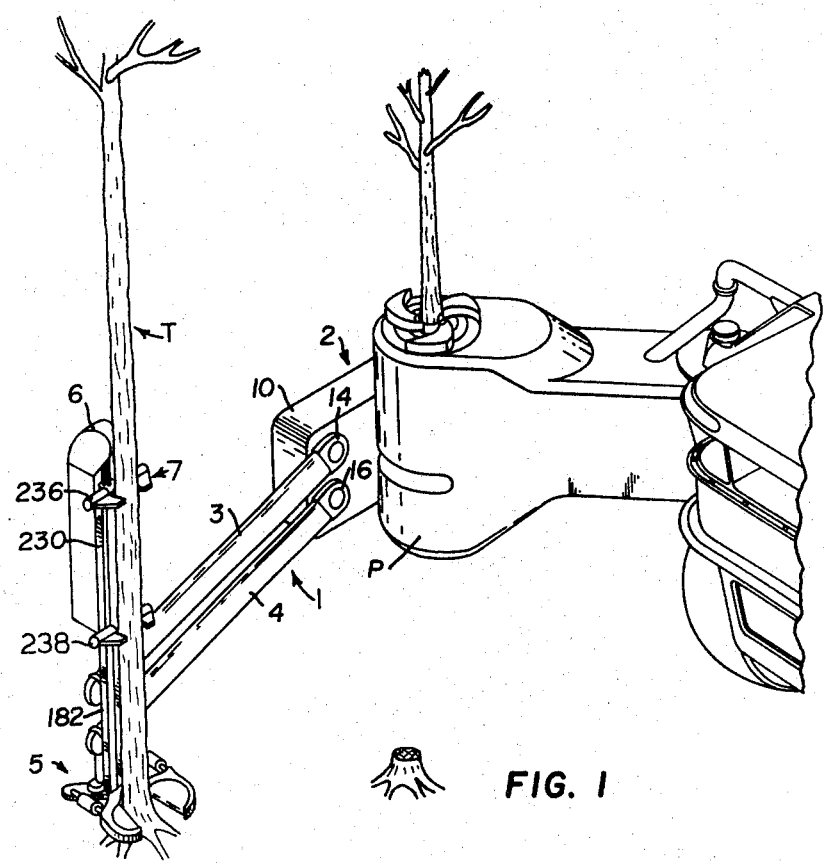

Referring to FIGS. 1 and 20, the head-reach system 1 is detachably mounted to a primary arm P of a tree harvesting machine. The system 1 includes a base assembly 2 having a pair of secondary arms 3 and 4 pivotally secured thereto and extending outwardly thereof. Arms 3 and 4 are each mounted for movement in a vertical plane and in an arc of vertical movement. The lower arm 4 carries at its free end a tree shearing mechanism 5 while the upper arm 3 carries a tree grasping and transfer head 6.

With arms 3 and 4 in the position of FIG. 1 or 20, a tree T is engaged by the grasping and transfer mechanism 6 and is severed from its stump by the shears 5. Arm 3 is then actuated to swing upwardly independently of arm 4 to raise the grasping and transfer mechanism 6 with the tree bole to a feed position F.P. at which time the feed mechanism on the grasping and transfer head assembly 6 is actuated to feed the tree bole downwardly into a processing station on the primary arm P.

The tree is subsequently grasped by a primary feed system in the processing station P, FIG. 1 at which point the grasping and transfer mechanism is lowered by arm 3 towards the FIG. 20 position. It is to be noted that after the tree is sheared and arm 3 is raising the bole to the feed position arm 4, through the available movement of the base assembly 2 is free for horizontal and vertical movement so as to place its shear 5 about another tree. In this regard it is to be further appreciated that there is no structural connection, but only a register point R, between the base of grasping head 6 on arm 3 and the shear assembly 5 on arm 4, arms 3 and 4 being free to operate independently of but in unison with one another.

On completion of the processor feed cycle, the grasping head 6 is lowered down to its point of registry R on the shear 5 (FIG. 2) where the tree grasping jaws (236 FIG. 3) are actuated to engage the trunk of the next tree to be severed as shown in FIG. 1 and the cycle is repeated.

The reduction in cycle time through the ability of the shear 5 to be positioned on a second tree while the arm 3 is transferring the first tree to the processor, will be appreciated.

SECONDARY ARMS & BASE ASSEMBLY FIGS. 4-9

Figure 4:
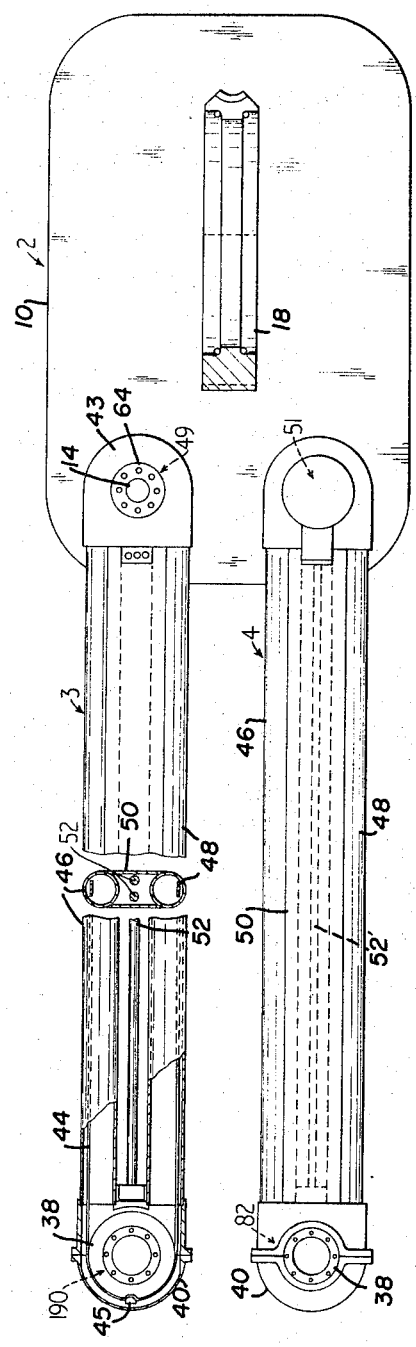
FIG. 4 is a side elevation of the base assembly and the arms extending therefrom.
Figure 7:
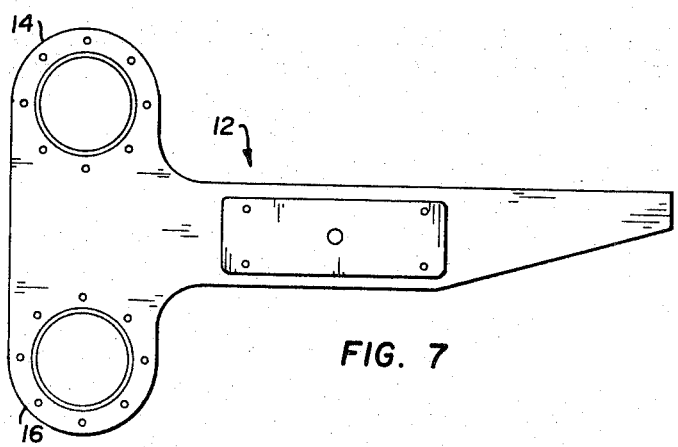
FIG. 7 is a side elevation of the base that supports the operative mechanism shown in FIGS. 5 and 6.

Referring to FIG. 4, the base assembly 2 is shown with a cover 10 which encloses the operating mechanism for arms 3 and 4. This mechanism is detachably mounted on a base 12 (FIG. 7) having upper and lower lugs 14 and 16 thereon. FIG. 5 illustrates the manner by which base 12 is detachably secured to the primary arm P of the tree harvesting machine shown in U.S. Pat. No. 3,533,458 and specifically to the annular supporting ring 18 therein whereby rotation of the ring 18 affects movement of the complete base assembly 2 and its arms 3 and 4 in a horizontal arc. The arm operating mechanism supported by base 12 includes a motor 20, tank 22, hydraulic pump 24, a rotary actuator 26 connected to the pump 24 through a valve 28 and a linear actuator 34.

Figure 6:
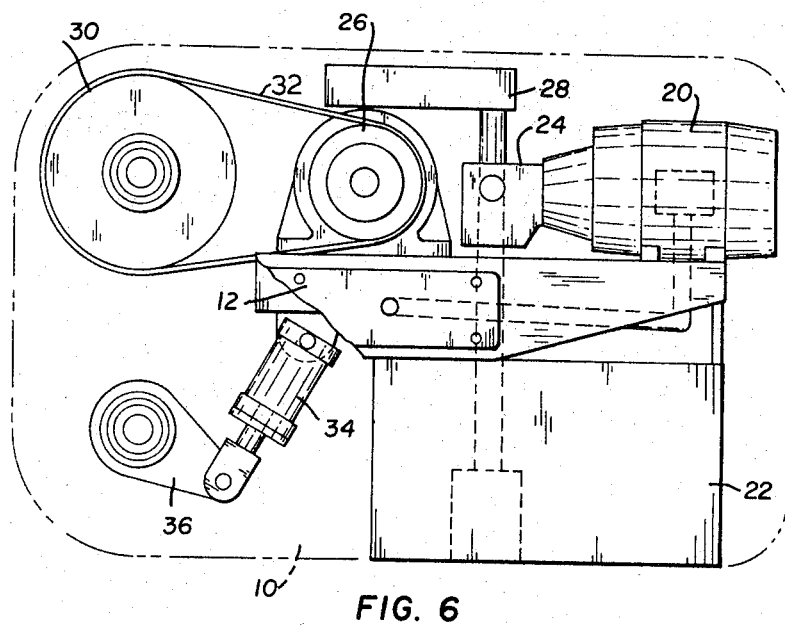
FIG. 6 is a sectional view taken along the line 6—6 of FIB. 5.

Arm 3 is mounted on lug 14 and arm 4 is similarly mounted on lug 16. Arm 3 is rotated in lug 14 through a sprocket 30 that is connected to the rotary actuator 26 by a chain drive 32. Arm 4 is rotated in lug 16 by the linear actuator 34 and a link 36 which is connected to arm 4 through the lug 16, as shown in FIG. 6. Arm 4 which carries the shear 5, is moved through a normal arc of 40° while arm 3 which carries the grasping, transfer and feed mechanism 6 is movable through a normal arc of 146°. Both arms may be positioned above or below the normal position as illustrated in FIG. 20 as required by ground contours.

Figure 9:
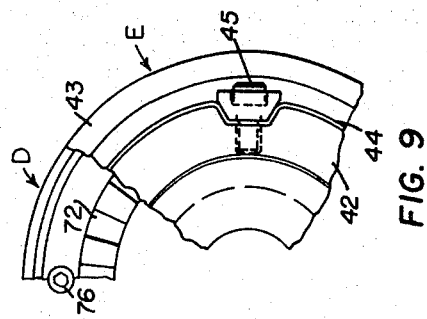
FIG. 9 is a fragmentary elevation view of a portion of FIG. 8 and showing those portions of FIG. 8 indicated as D and E.

It will be noted from FIG. 20 that arm 3 during movement through its arc must maintain mechanism 6 in an approximate vertical orientation and arm 4 likewise maintains shear 5 approximately horizontally during its movement through its arc. The structure of the arms 3 and 4 that allows them to retain the required orientation of their sub-assemblies is shown in FIG. 4 and in detail in FIGS. 8 and 9.

Looking first at FIG. 4, arm 3 is partially cut away to illustrate a circular collar 38 rotatably mounted at its outer end in a split housing 40. A similar collar 42 (FIG. 8) is provided at the assembly end of arm 3 and is mounted in a housing 43 which is interconnected to the sprocket 30. A tension strap 44, in the form of a belt of suitable metallic material such as titanium, interconnects both collars 38 and 42 and is secured to those heads by lock assemblies 45 as shown in view E of FIG. 9. Tubular members 46 and 48 enclose the upper and lower runs respectively of the strap 44 and side plates 50 on the arms 3 and 4 provide total enclosure for their respective hydraulic lines 52 and 52' which connect the mechanisms 5 and 6 with the hydraulic system on the base structure 12, by way of rotary hydraulic joints 49 and 51 as shown. The structure of arm 4 is identical to that of arm 3 and therefore need not be described.

Figure 8:
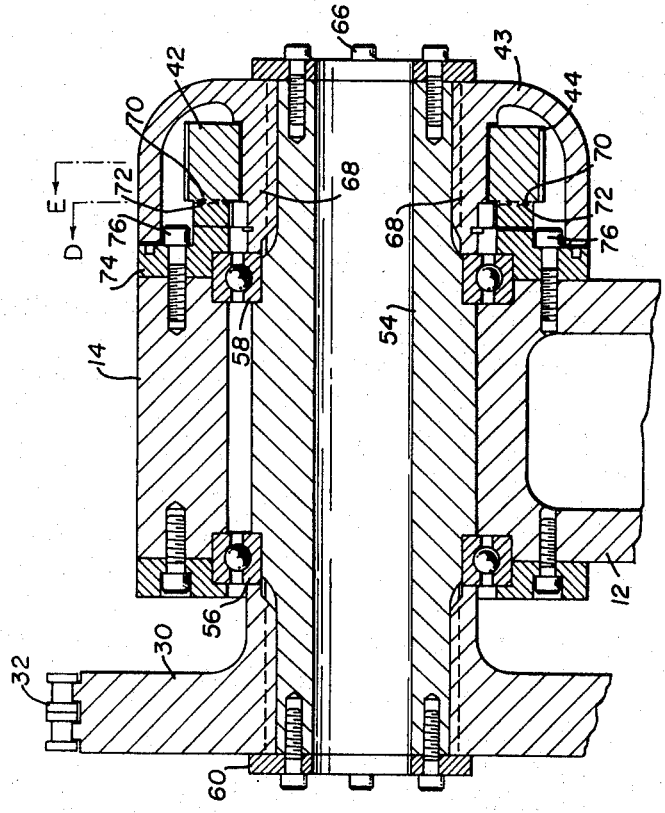
FIG. 8 is a sectional view taken along the line 8—8 of FIG. 5.

FIG. 8 is a detailed sectional view of the lug 14 and head 43 and it will be seen that a hollow shaft 54 is mounted for rotation in lug 14 in ball races 56 and 58. Sprocket 30 is splined onto one end of shaft 54 and is secured thereon by a cap 60 and bolts 62 and, at the other end of shaft 54, housing 43 is splined thereon and is secured by a cap 64 and bolts 66. Therefore, rotation of sprocket 30, shaft 54 and housing 43 by the rotary actuator 26 and chain 32 raises or lowers arm 3 by the torque applied to housing 43.

Collar 42 is freely mounted to an annular portion 68 of the housing 43 and it has a toothed annular face 70 engaging a like face 72 on a flange 74 secured to the lug 14 by bolts 76 as illustrated in view D. Accordingly collar 42 and band 44 are secured to the lug 14 through the flange 74 and held thereby against the rotary movement imparted to the housings 43. Therefore, when the arms 3 or 4 are raised or lowered, the tension strap 44 provides a parallelogram action to the heads 38 and the mechanisms carried thereby with the result that the grasping and transfer mechanism 6 and shear assembly 5 are retained in their desired orientation during movement of the arms 3 and 4 through their limited arcs of movement as shown in FIG. 20.

SHEAR MECHANISM FIGS. 10-12

Figure 2:
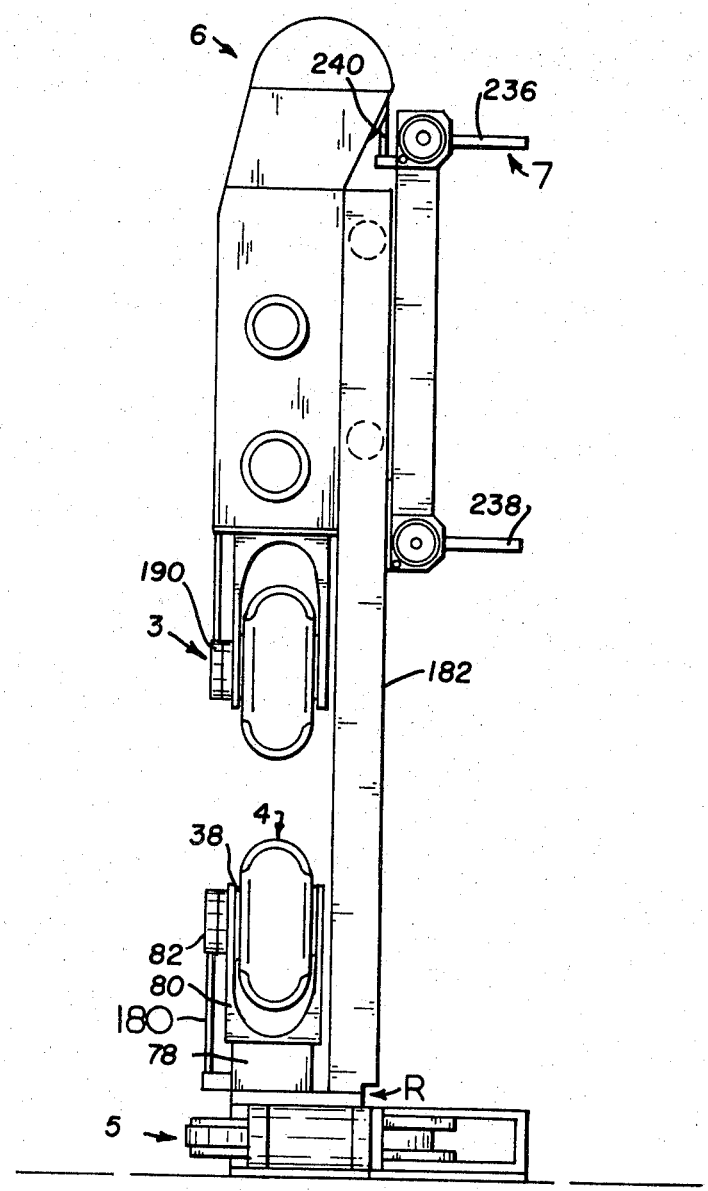
FIG. 2 is a front elevation of the apparatus shown in FIG. 1.
Figure 3:
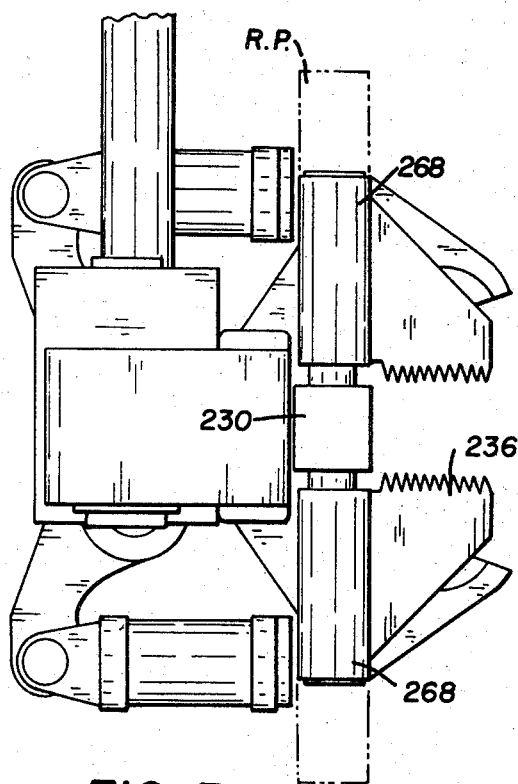
FIG. 3 is a plan view of the portions of the system shown in FIG. 2.

Referring first to FIG. 2, the shear 5 includes a cylindrical column 78 with a yoke 80 at its upper end which is connected to the head 38 on secondary arm 4. Yoke 80 also supports a rotary hydraulic joint 82 which provides a terminus for the outer ends of the hydraulic lines 52 in the secondary arm 4 and for the lines in the shear mechanism 5.

Figure 10:
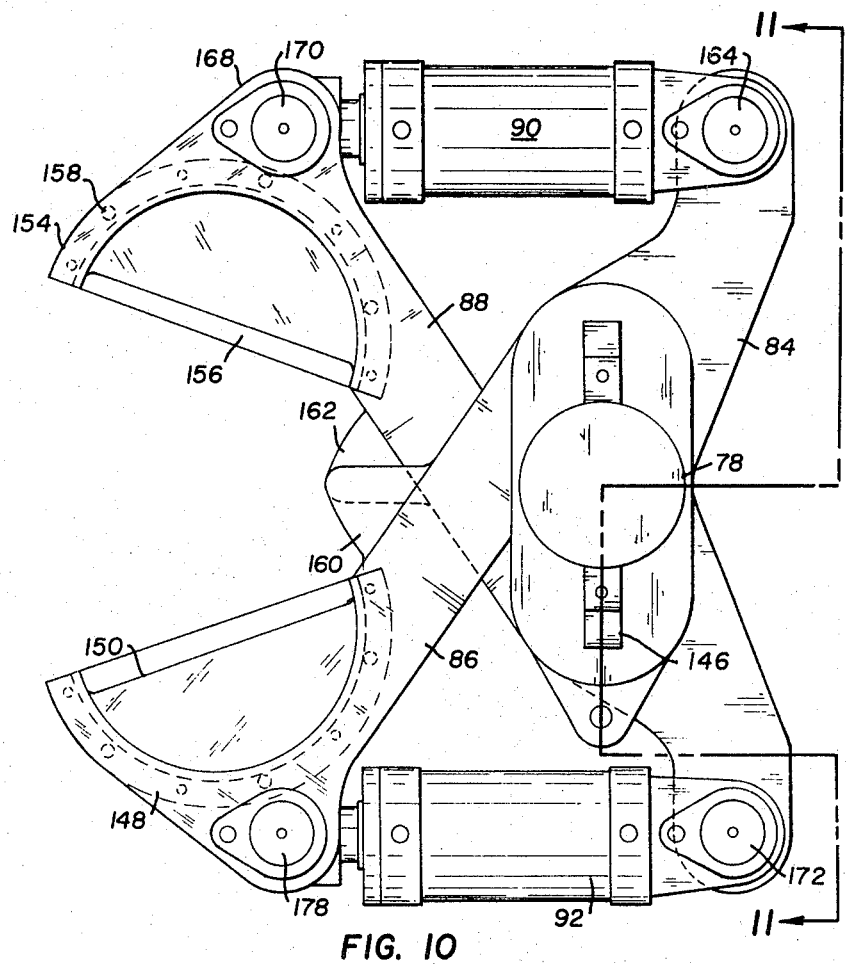
FIG. 10 is a plan view of the shears shown in FIG. 1 and in an open position.
Figure 11:
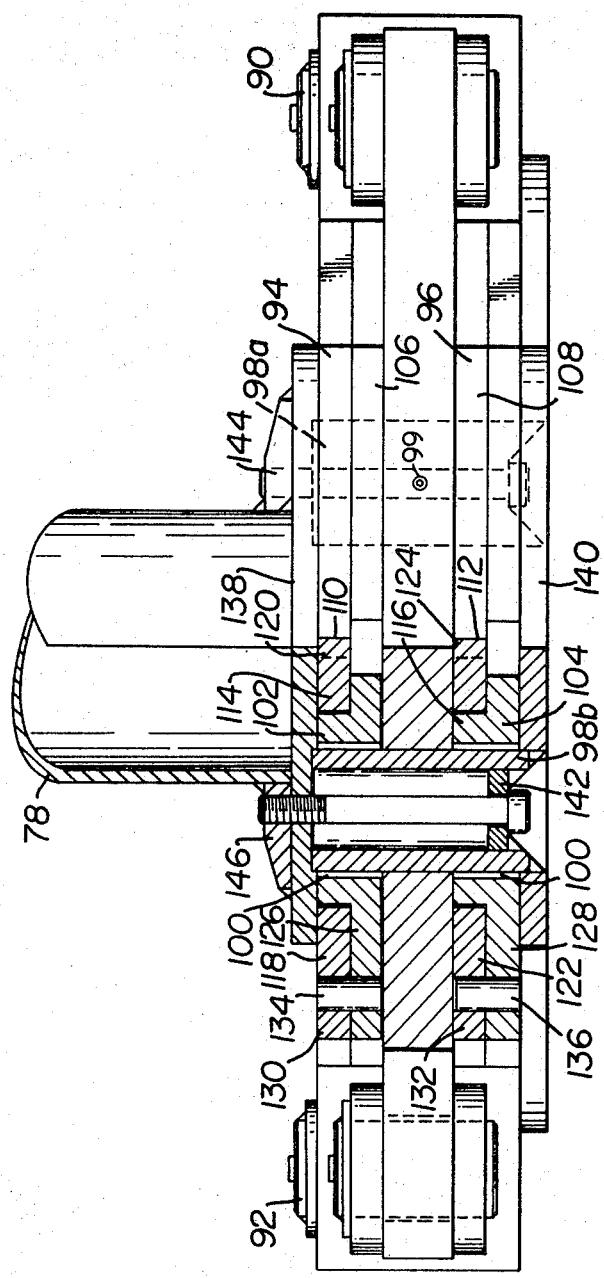
FIG. 11 is a sectional view along lines 11—11 of FIG. 10.
Figure 12:
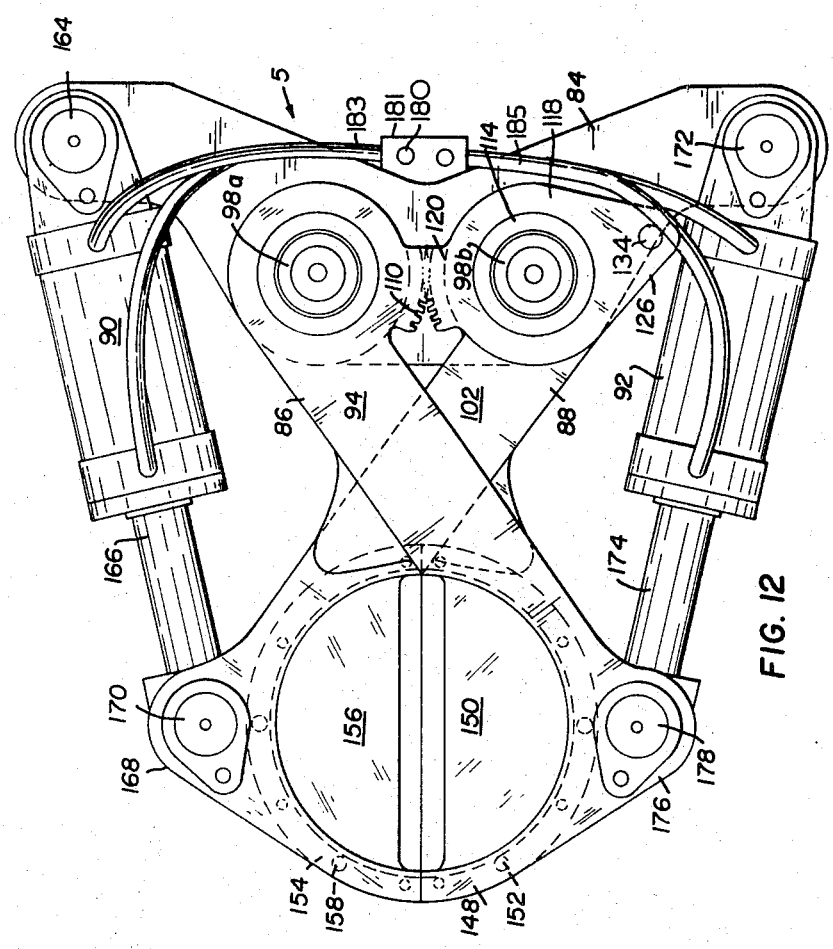
FIG. 12 is another plan view of the shears but shown in a closed position.

As shown in FIGS. 10-12 the shear 5 consists of a base platform 84, blade carrying arms 86, 88 and blade actuators 90, 92. The base platform 84 is somewhat bow-shaped in plan view with a wide central portion and narrowed ends extending therefrom.

Arm 86 comprises spaced upper and lower members 94 and 96, the inner ends thereof being disposed above and below the base platform 84 and being pivotally mounted thereto by a cylindrical bearing sleeve 98a and bushings 100. In like fashion, arm 88 has spaced upper and lower members 102 and 104, the inner ends of which are disposed above and below the base platform 84(FIG. 11) and pivotally mounted thereto on a cylindrical bearing sleeve 98b and bushings 100. Set screws 99 are provided for maintaining location of the arms on the sleeves and to prevent floating thereof.

It will be noted from FIGS. 10 and 11 that the upper and lower members of arm 86 cross over the upper and lower member respectively of arm 88 to increase blade travel and leverage but to operate the arms in unison the inner ends thereof are geared together. Accordingly, the inner end of arm member 94 is separated from the surface of the base platform 84 by a spacer 106 while another spacer 108 underlies the same end of the lower arm member 96. Also, the inner ends of arm members 94 and 96 have annular gears 110 and 112 respectively (FIG. 11). The inner ends of arm members 102, 104 are lower in elevation than their opposite members on arm 86. As shown in FIG. 11, members 102, 104 terminate in upstanding annular flanges 114 and 116 respectively and are concentric with the sleeve bearing 98b. The inner end of arm 102 supports a spacer 118 having an annular gear 120 in mesh with gear 110 on arm member 94 and member 104 carries a spacer 122 having an annular gear 124 in mesh with gear 112 on arm member 96. The inner ends of arm members 102, 104 have projecting portions 126, 128 that mate up with matching projections 130, 132 on the geared spacers 118 and 122. A shear pin 134 connects the projections 126 and 130 and pin 136 similarly connects projections 122 and 128. Therefore it will be observed from FIG. 10 or 12 that movement of either arm 86 or 88 will be transmitted to the other through the geared portions to maintain synchronization in the event of unbalanced arm loadings.

The inner end of arms 86 and 88, and the spacers 106, 108, 118 and 122 are clamped to the base platform 84 by upper and lower plates 138 and 140. Sleeves 98a and b are welded to the lower plate 140 and have countersunk shoulders 142 engaged by bolts 144 passing upward through the sleeves and threadably engaging plate 138 and ears 146 on the cylindrical column 78 as shown in FIG. 11. It will be noted from FIG. 11 that the upper ends of sleeves 98a and 98b are recessed as at 137 into the lower face of plate 138 for positive location on the base structure.

The outer end of arm 86 is formed as a semi-circular collar 148 and a shear blade 150 is secured to the lower rim thereof by dowel pins and bolts 152. In like fashion, the outer end of arm 88 is formed as a semicircular collar 154 having a shear blade 146 secured to its lower rim by dowel pins and bolts 158. Additionally, arms 86 and 88 are provided with projections 160 and 162 respectively to form a gauge for limiting the position of a tree between the open shear blades 150 and 156 as shown in FIG. 10.

Hydraulic actuator 90 is pivotally connected at one end to base platform 84 by a bearing 164 and the free end of its piston rod 166 is pivotally connected to a projection 168 on collar 154 by a bearing 170. Similarly, actuator 92 is pivotally connected to the other end of base 84 by a bearing 172 and the free end of its piston rod 174 is pivotally mounted to a projection 176 on collar 148 by a bearing 178.

As illustrated in FIGS. 2 and 12, hydraulic fluid is carried to the actuators 90, 92 from the rotary joint 82 via conduits 180, block 181 and lines 183 and 185. Retraction of the actuators 90, 92 moves the shear 5 to the open position of FIG. 10 and actuation closes the shear 5 to the position of FIG. 12.

TRANSFER HEAD

Referring to FIGS. 1, 2 and 20, the transfer head and feed mechanism 6 effects vertical reciprocation of the grasp mechanism 7 on a channel track 182 from an uppermost tree grasping position shown in full line in FIG. 20 to the lowermost position at RP shown in phantom line in FIG. 20.

Figure 13:
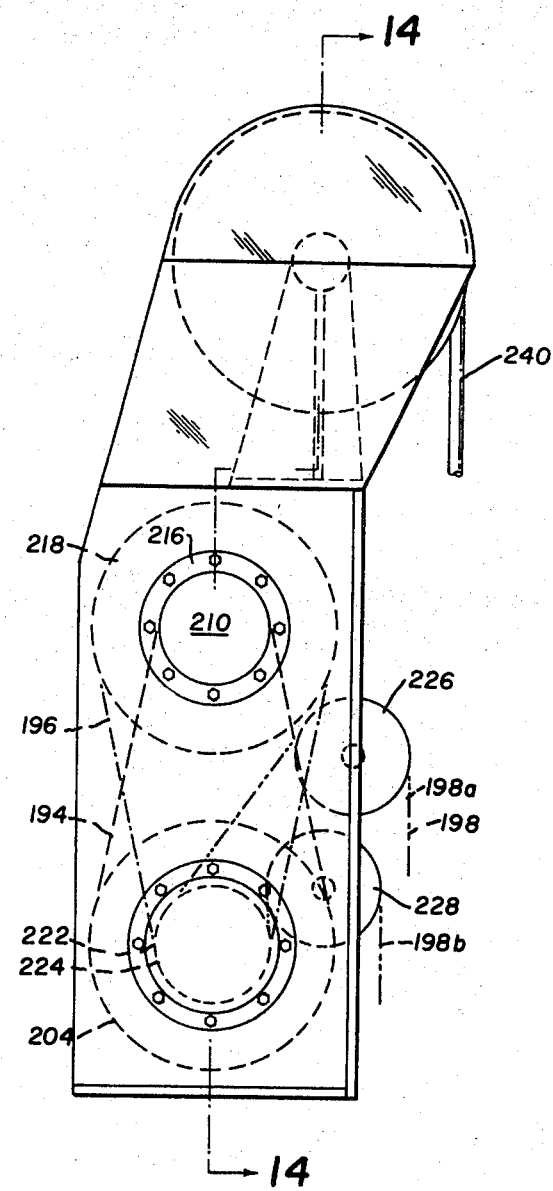
FIG. 13 is a side elevation of the sprocket housing shown in FIG. 2.

The means for reciprocating the grasp mechanism 7 will be described in detail with respect to FIGS. 13 and 14, but briefly, the grasp mechanism 7 includes a carriage mounted in the track 182 and the carriage retains the terminal ends of a carriage chain. A rotary actuator, operating a series of sprockets, draws on one or the other ends of the carriage chain to provide either upward or downward movement of the carriage in its track.

FEED MECHANISM SUB ASSEMBLY

Figure 14:
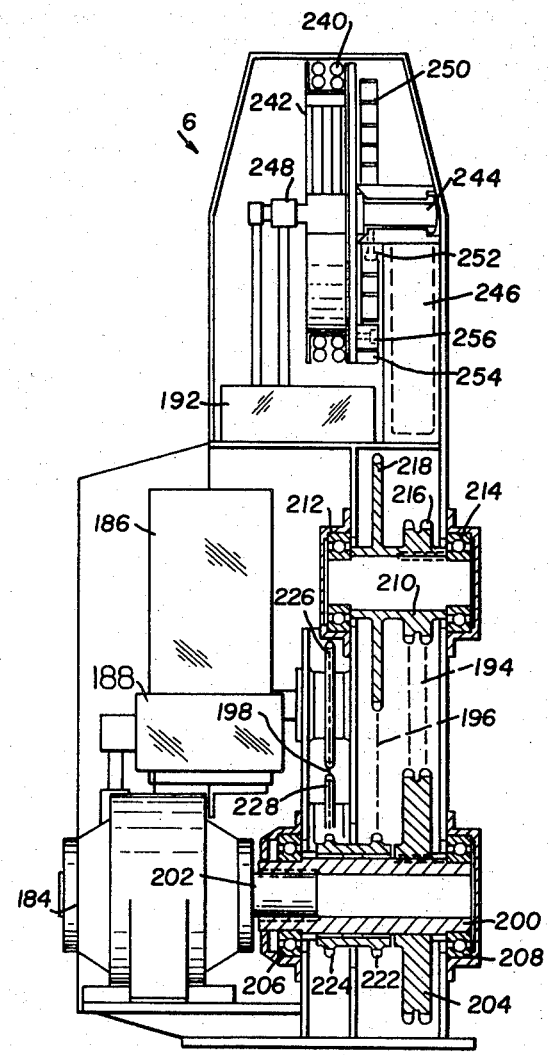
FIG. 14 is a sectional view taken along the line 14—14 of FIG. 13.

FIG. 14 is a rear view in section of the head 6 as viewed in FIG. 20, the head 6 supporting an hydraulic sub-system subsequently described and which includes a rotary actuator 184 for operating the feed mechanism via a sprocket and chain arrangement. Three sets of chains are utilized as shown in FIGS. 13 and 14; a primary or drive chain 194 shown thus - - - ; a secondary or driven chain 196 shown thus - . - . - . ; and the aforementioned carriage chain 198 shown thus - . . . - . . . .

Referring to FIG. 14, a drive shaft 200 is splined onto the actuator shaft 202 and a dual drive sprocket 204 is keyed onto the shaft 200 adjacent its outer end, the shaft 200 being supported for rotation in caged bearing 206 and 208. An idler shaft 210 is supported above shaft 200 in caged bearings 212, 214 and supports a dual driven sprocket 216 as well as a secondary drive sprocket 218. It will be apparent that shaft 210 and its sprockets are rotated from sprocket 204 on drive shaft 200.

Intermediate the sprocket 204 and the bearing 206, shaft 200 supports a hub 220 for free rotation thereon and which carries a secondary driven sprocket 222 and a carriage chain drive sprocket 224 which is aligned with two idler sprockets 226 and 228. It will now be apparent that (a) the primary drive chain 194 rotates sprockets 216 and 218 from sprocket 204; (b) sprocket 218 in turn rotates hub 220 and its sprockets 222, 224 through secondary chain 196 and (c) that sprocket 224 runs chain 198 through idler sprockets 226 and 228. Referring to FIG. 15, carriage 230 has a connector plate 232 to one end of which is secured one terminal end of the chain 198, specifically the outer run 198a (FIG. 12). The terminal end of the inner run 198b is secured to the outer end of the connector plage 232 after reversing direction around an idler sprocket 234 mounted on the lower end of track 182 (FIG. 16).

From the foregoing disclosure, it will be apparent that operation of the rotary actuator 184 raises or lowers the carriage 230 of the feed mechanism through the sprocket and chain drives. In the illustrated example of the invention, the actuator 184 provides 270° of rotation to the drive shaft 200 and the ratio of the primary to secondary to carriage sprockets is such that the 270° rotation of actuator 184 gives approximately six feet of linear vertical movement to the carriage 230 in its track 182.

TREE GRASPING MECHANISM

FIGS. 1, 2 and 20 generally illustrate that carriage 230 includes upper and lower tree grasping jaws 236, 238 respectively, which operate from a grasping position (FIG. 3) to a release position 90° from the grasp positions shown at RP in FIG. 17. The reason for the angular movement of the jaws will become apparent from a study of FIGS. 1 to 3. When a tree has been severed by the shear 5 and is being transferred to the primary arm P by arm 3, arm base 10 and arm 4 move horizontally to position shear 5 about the next tree selected for cutting. It will be noted that arm 3 moves only vertically with respect to arm 4 and therefore to bring the carriage 230 down beside the tree T and to place the lower end of the track 182 onto the shear housing at the registry point, the jaws 236, 238 must be raised upwardly to allow carriage 230 to slide downwardly past the tree T. When the arm 3 lowers the transfer head 6 to the FIG. 2 position, the jaws can then be actuated to their FIG. 1 or 3 position.

The jaws 236, 238 are hydraulically operated, pressurized fluid being delivered from the grasp valve 192 to the carriage 230 by flexible lines or hoses 240 (FIGS. 2 and 19).

Referring to FIG. 14, the head 6 supports an hydraulic sub-system consisting of the rotary actuator 184, an accumulator 186 and an actuator valve 188. The latter is fluidly connected from the lines 52 in arm 3 by way of a rotary hydraulic joint 190 (FIG. 2). Actuator valve 188 is also fluidly connected to the actuator 184 and the grasping valve 192 as shown in the hydraulic diagram of FIG. 19.

Head 6 also houses a hose drum 242 mounted for rotation on a shaft 244 supported by a bracket 246. An hydraulic rotary joint 248 connects the terminal ends of the hose 240 on the drum 242 with the grasp valve 192. As the hose 240 must be unwound from and wound onto the drum 242 in accordance with vertical movement of the carriage 230, a tensioning means is provided in the form of a spiral wound flat spring 250 secured at the end to the shaft 244 by a bolt 252. The other end of the spring 250 is detachably secured to the drum 242 by being clamped between a shoulder 254 and an eccentric 256, both of which project from the planar surface of the drum 242 adjacent the periphery thereof.

FIG. 16 shows that the carriage track 182 is box-like in structure having a main panel 258, end panels 260 and front panels 262, thereby forming a pair of vertically extending closed tracks. Carriage 230 comprises a box like body 264 (FIGS. 15 and 17) supporting at its upper end a first pair of tree grasping units 268 including the upper grasping jaws 236 and, at its lower end, a second pair of tree grasping units 270 including the lower grasping jaws 238. Two sets of rollers are provided on the carriage 230, a first set comprising upper and lower pairs 272, 274 respectively adapted to roll on panels 258 and 262 of the track 182, and a second set comprising upper and lower pairs 276, 278 respectively for engaging the side panels 260 of the track 182 as shown in FIGS. 16 and 17.

It will be noted from FIG. 17 that the lower end of the carriage body 264 is detachably secured to tree grasping unit 270 via a block 280 having passageways 282 therein for the communication of hydraulic fluid between the actuators and hydraulic tubing 283 extending through the carriage interior similar passages being provided in block 281.

Attention is directed to the lower right hand portion of FIG. 17 and FIG. 18 for details of one of the actuators, all of them being identical in construction. Each actuator 270 comprises a pair of sleeves, an inner sleever 284 one end of which is inset into block 280 and welded or otherwise secured therein; and an outer sleeve 286 coaxially mounted on the exterior surface of sleeve 284 for limited reciprocal movement thereon. The outer sleeve 286 has a centrally positioned rod 288 therein with a piston 290 on its terminal end. Sleeve 284 provides a cylinder for piston 290 which reciprocates therein in response to hydraulic pressure applied thereto with the result that its associated sleeve 286 is reciprocated up to the position shown in phantom line in FIG. 17, such movement being on bearing members 292 on sleeve 286 and 294 on sleeve 284.

It has been mentioned that the grasping jaws 236 and 238 are rotated 90° from their full to phantom positions and vice-versa as shown in FIG. 17. This is effected by cooperation between slots 296, 298 in each sleeve 286 and guides 300, 302 in each cylinder 284. As shown in FIG. 18 guides 300, 302 carrying sleeve bearings 301 and 303 respectively, are threadably engaged in cylinder 284 at diametrically opposed positions therein, the sleeve bearing of each guide riding in an associated slot.

The lower or rearward guide 302 includes a central passageway 304 which interconnects the interior of cylinder 284 with the return line 306 and passage 308 of block 280. Accordingly, pressure through lines 282 against one end of piston 290 effectively drives it and its sleeve 286 to the phantom position of FIG. 17 (jaws 238 open) while pressure through lines 308, 306 and 304 drive the piston 290 to the full line position (jaw closed). In the position shown in the lower left hand side of FIG. 17, a position in which the jaw 238 is fully closed as in FIG. 3, it will be seen that the slot 296 extends parallel to the longitudinal axis of sleeve 286 for approximately half its length (296a) (the length compensating for tree diameter) then curves gently into an angular 45° portion, 296b. As the sleeve 286 is driven straight outwardly along slot 296a by piston 290 the jaws 238 are moved through a straight releasing position. Then, as the curved portion of the slot engages the guide 300, sleeve 286 and its jaw 238 are rotated through a 90° position to the return position shown in FIGS. 17 and 1.

HYDRAULIC CIRCUIT

The hydraulic circuit is shown in FIG. 19 and reference should be made to the electrical diagram of FIG. 21 for the sequential operation of the valves and actuators.

The circuitry is sub-divided into three sections; the elbow section which includes the hydraulic apparatus on the base 2; the arm sections; and the head sections which consist of the hydraulic apparatus carried on the shear assembly 5 and on the grasping head 6.

The elbow section, as shown, includes the tank 22, motor 20, hydraulic pump 24 and the valve 28 (shown as valve A in FIG. 19). Valve $A_1$ interconnects rotary actuator 26 to the circuit with cylinder 34 (FIG. 6) being joined through valve $A_2$.

Valve $A_3$ connects the shear cylinders 90 and 92 in one head section via the lines 52' and the rotary hydraulic joints 51 and 82 in the arm section.

The second head section is connected to the circuit through the other arm section and its rotary hydraulic joints 49 and 190. As shown, the second head section comprises the feed slide actuator 184 actuated via valve "B" (188 in FIG. 14) while valve C, (192 in FIG. 14) operating through rotary hydraulic joint 248 connects the grasp cylinders 236 238 through lines 240.

OPERATIONAL SEQUENCE

FIG. 20 illustrates the head-reach assembly 1 with the arms 3 and 4 in position of engagement to a tree T and also shows the transfer and feed mechanism 6 in transfer, feed, release and return positions. The shear assemblies of the head-reach system has been positioned on the butt of a tree at ground level by appropriate horizontal movement of the primary and secondary arms (see FIG. 1 and U.S. Pat. No. 3,533,458) and by vertical positioning of arm 4 by means of the actuator 34, accurate tree bole position in relation to head-reach assemblies being set by gauges 160-162 of the shear assembly 5 (FIG. 10).

The transfer head 6 with the grasping jaws 236, 238 in their raised or ready to grasp position F, has been brought down by arm 3 behind the tree as viewed in FIG. 20 so that transfer head 6 rests on its point of registry on the shear assembly 5, the feed carriage assembly at this point being in its uppermost position.

In the sequence that follows, bracketed references refer to FIGS. 19 and 21. 1. The cycle is initiated by the operator closing the start button, FIG. 21, and the cycle now starts with the grasping jaws 236, 238 then being actuated to their grasp position A (valve C-1) by their actuators to engage the tree. 2. The shear blades 150, 156 are closed (valve A2-1) by their cylinders 90, 92, shearing the tree from its stump. 3. After shear completion, arm 3 is raised (valve A1-1) through the transfer position B to the ready to feed position FP by rotary actuator 26 so that the butt end of the tree bole is directly above and in registry with the opening to the tree processor P. 4. The feed slide actuator 184 is operated (valve B-1) lowering the carriage 230 downwardly through the feed position C until the lower end of the tree bole is engaged by a primary feed system within the processor. 5. When the carriage 230 reaches the lower end of its travel, or the release position D, the grasping jaws 236, 238 are opened (valve C-2) and the carriage 230 is actuated to its upper or return position R.P. (valve B-2) 6. Transfer arm 3 is then lowered (valve A1-2) through position E while the carriage 230 is being raised, the grasping jaws 236, 238 being in their opened position. 7. The transfer head 6 is again lowered onto the registry point, position F, on the shear assembly 5 thus completing the transfer cycle.

It is to be appreciated that during the period of the above described automatic transfer cycle, the machine operator repositions the shear arm assembly on the next tree to be processed and controls the initiation of the next cycle.

It will be appreciated that the present invention may be embodied in other specific forms without departing from the spirit or essential characteristics thereof. The present, illustrated embodiment is therefore to be considered in all respects as illustrative and non-restrictive, the scope of the invention being indicated by the appended claims rather than by the foregoing disclosure and all changes which come within the meaning and range of equivalency of the claims are therefore intended to be embraced therein.

The embodiments of the invention in which an exclusive property or privilege is claimed are defined as follows:

1. A head reach system for a tree harvesting machine comprising:
   a. a vertically oriented base assembly;
   b. means connecting said base assembly to said harvesting machine, said connecting means and said base assembly being swingable in a horizontal plane relative to said harvesting machine;
   c. a pair of arms each pivotally mounted at one of their ends on the base assembly, one above the other, and extending outwardly of said base assembly;
   d. tree severing means attached to the outer end of a first arm of said pair thereof;
   e. tree grasping and transfer means attached to the outer end of the second arm of said pair thereof, said second arm being movable independently of said first arm to move said tree grasping and transfer means from (i) a grasping position coaxial with said tree severing means and a tree being severed thereby, to (ii) a transfer position away from said tree severing means and out of coaxial relationship therewith to transfer said tree to a tree processing station and (iii) back to said grasping position;
   f. means for actuating said tree severing means and for moving said first arm through a limited arc with respect to said base assembly independently of said second arm; and
   g. means for actuating said grasping and transfer means and for moving the second arm through a limited arc with respect to the base assembly independently of said first arm between said grasping, said transfer and said grasping positions.

2. A head-reach system for a tree harvesting machine comprising:
   a. a base assembly;
   b. means connecting the base assembly to said harvesting machine, said base and connecting means having limited movement in a horizontal plane with respect to said harvesting machine;
   c. a pair of arms each pivoted at one of their ends to and extending outwardly of said base assembly, said arms being disposed one above the other;
   d. tree shearing means attached to the outer end of a first arm of said pair thereof;
   e. tree grasping and transfer means attached to the outer end of the second arm of said pair thereof, said second arm being movable independently of said first arm to move said tree grasping and transfer means from (i) a grasping position coaxial with said tree shearing means and a tree being severed thereby to (ii) a transfer position remote from said tree severing means and out of coaxial relationship therewith to transfer said tree to a tree processing station and (iii) back to said grasping position;
   f. means for actuating said tree shearing means and for moving said first arm through a limited vertical arc with respect to the base assembly independently of said second arm;
   g. means for actuating the tree grasping and transfer means and for moving the second arm through a limited vertical arc with respect to the base assembly independently of said first arm between said grasping, said transfer and said grasping positions; and
   h. means on said first and second arms for maintaining the shearing means and the tree grasping and transfer means, respectively, in a substantially vertical position throughout their limited arcs of movement.

3. The system according to claim 2 including a feeding mechanism associated with said tree grasping and transfer means and comprising a head structure secured to said second arm; a track secured to said head and extending downwardly therefrom in substantially vertical orientation; a carriage with said tree grasping means mounted on said track for reciprocation therealong from an upper, tree grasping position to a lower, feeding position; motor means in said head structure for reciprocating said carriage; and transmission means in said head interconnecting said motor means and said carriage.

4. A head-reach system for a tree harvesting machine comprising:
   a. a base assembly for connection to said harvesting machine and having limited horizontal movement with respect thereto;
   b. a pair of arms each pivoted at one of their ends to, and extending outwardly of, said base assembly and disposed one above the other;
   c. tree severing means attached to the outer end of a first arm of the pair thereof;
   d. tree grasping, transferring and feeding mechanism attached to the outer end of the second arm of the pair thereof and including (i) a head structure secured to said second arm, (ii) a track secured to said head and extending downwardly therefrom in substantially vertical orientation, (iii) a carriage, with said tree grasping means, mounted on said track for reciprocation therealong from an upper, tree grasping position to a lower, feeding position; (iv) motor means in said head structure for reciprocating said carriage, (v) and transmission means in said head interconnecting the motor means and the carriage;
   e. means for actuating said tree severing means and for moving said first arm through a limited vertical arc with respect to said base assembly;
   f. means for actuating the grasping, transferring and feeding mechanism and for moving the second arm through a limited vertical arc with respect to the base assembly and with respect to the first arm for transferring a tree bole to and feeding it into said tree harvesting machine; and
   g. means on the first and second arms for maintaining the tree severing assembly and the tree grasping, transferring and feeding mechanism respectively in a substantially vertical position throughout their limited arcs of movement.

5. The system according to claim 4 wherein each arm of said pair includes a head member pivotally mounted to said base assembly; hydraulic means on said base assembly for rotating said head and thereby raising or lowering said arm through its arc of movement; a collar at each end of said arm and mounted for rotation independent of said head, means providing engagement between one of said collars and said base assembly; and means interconnecting said collar on the ends of said arm, the tree shearing means being secured to the collar at the free end of one arm and the tree grasping, and transferring means being secured to the collar on the free end of the other arm.

6. The system according to claim 4 wherein said tree shearing means comprises a vertical column secured to the outer end of said first arm; a base platform secured to the lower end of said column; a pair of arms pivotally mounted at their inner ends to said base platform adjacent the lower end of said column and extending outwardly therefrom in a scissor arrangement; a collar at the outer end of each arm, a shear blade secured to said collar; and hydraulic actuators interconnecting the collar of each arm with said base platform.

7. The system according to claim 4 wherein the carriage comprises a body portion, rollers on said body for engaging said track; a pair of tree grasping jaws mounted at each end of said body and positioned normal thereto; and actuators associated with said pairs of jaws for reciprocating each pair thereof from a tree engaging position in which the jaws of each pair are drawn inwardly toward one another in a substantially horizontal position to a releasing position in which the jaws of each pair are moved away from one another and simultaneously rotated to a substantially vertical position.

8. The system according to claim 4 wherein said motor means comprises a rotary hydraulic actuator, said transmission means comprising:
   a. a drive shaft on said actuator;
   b. a drive sprocket on said drive shaft;
   c. an idler shaft spaced in parallel to said drive shaft with idler sprockets thereon;
   d. a second idler sprocket and second drive sprocket mounted for free rotation on said drive shaft and;
   e. a pair of third idler sprockets spaced in parallel to said other shafts;
   f. a primary chain interconnecting the first drive sprocket with said idler shaft;
   g. an intermediate chain interconnecting said idler shaft with said second idler sprocket; and a drive chain interconnecting said third drive sprocket with said carriage via said third idler sprockets whereby rotation of said drive shaft by the rotary actuator raises or lowers the carriage on said track.

* * * * *